United States Patent [19]

Ran et al.

[11] Patent Number: 5,706,059
[45] Date of Patent: Jan. 6, 1998

[54] MOTION ESTIMATION USING A HIERARCHICAL SEARCH

[75] Inventors: Xiaonong Ran, Cupertino; Michael van Scherrenburg, San Jose, both of Calif.

[73] Assignee: National Semiconductor Corp., Santa Clara, Calif.

[21] Appl. No.: 347,771

[22] Filed: Nov. 30, 1994

[51] Int. Cl.$^6$ ............................................. H04N 7/18
[52] U.S. Cl. .................. 348/699; 348/717; 348/416; 348/415; 348/411; 348/716; 348/700
[58] Field of Search ............................ 348/699, 700, 348/411, 412, 409, 408, 415, 416, 715, 716, 718, 720

[56] References Cited

U.S. PATENT DOCUMENTS

| | | | |
|---|---|---|---|
| 5,030,953 | 7/1991 | Chiang | 348/415 |
| 5,151,784 | 9/1992 | Lavagetto | 348/411 |
| 5,170,259 | 12/1992 | Niihara | 348/416 |
| 5,173,772 | 12/1992 | Choi | 348/416 |
| 5,351,095 | 9/1994 | Kedranavat | 348/699 |
| 5,355,168 | 10/1994 | Sugiyama | 348/699 |
| 5,357,287 | 10/1994 | Koo et al. | 348/416 |
| 5,428,403 | 6/1995 | Andrew et al. | 348/699 |
| 5,471,252 | 11/1995 | Lu | 348/699 |
| 5,489,949 | 2/1996 | Jeong et al. | 348/700 |
| 5,512,962 | 4/1996 | Homma | 348/415 |

FOREIGN PATENT DOCUMENTS

A 0 363 677  4/1990  European Pat. Off.

OTHER PUBLICATIONS

Her–Ming Jong et al., "Parallel Architectures for 3–Step Hierarchical Search Block–Matching Algorithm," *IEEE Transactions on Circuits and Systems for Video Technology*, vol. 4 No. 4 (Aug. 1994) pp. 407–415.

Liang–Wei Lee et al., "Dynamic Search–Window Adjustment and Interlaced Search for Block–Matching Algorithm," *IEEE Transaction on Circuits and Systems for Video Technology*, vol.3 No.1 (Feb. 1993) pp.85–87.

*Primary Examiner*—Tommy P. Chin
*Assistant Examiner*—Anand Rao
*Attorney, Agent, or Firm*—Skjerven, Morrill, MacPherson, Franklin & Friel; David T. Millers

[57] ABSTRACT

A hierarchial search for moving image encoding determines a motion vector by comparing a target block to sets of blocks selected according to the results of previous comparisons. Typically, each set of blocks includes a central block and four blocks offset on x and y axes. Blocks most similar to the target block provide co-ordinates of a center block in a next stage of the search. The hierarchial search searches regions indicated by previous comparisons to be similar to the target block and thereby reduces the number of comparisons and the search time required to find a motion vector. A motion estimation circuit for the hierarchial search includes: five processing elements which compare the target block to five blocks; a first memory that asserts a target block pixel value to the processing elements; a second memory that asserts five search window pixel values to the processing elements. The processing elements operate in parallel, and an address generator selects the five search window pixel values according to output from the processing elements. The second memory contains three parts. One part is loaded with new data while the processing elements search data from the other two parts. Each part contains nine memory modules, each having an independently addressable data port.

29 Claims, 6 Drawing Sheets

FIG. 5

MOTION ESTIMATION USING A HIERARCHICAL SEARCH

CROSS REFERENCE TO RELATED APPLICATION

This application is related to and incorporates by reference in its entirety cofiled U.S. Pat. No. 5,627,601, entitled "Motion Estimation with Bit Rate Criterions."

BACKGROUND OF THE INVENTION

1. Field of the Invention

This invention relates to circuits and processes for motion estimation in digital encoding of moving images.

2. Description of Related Art

A moving image can be created by displaying a succession of frames (or still pictures) where each frame differs slightly from a previous frame, and the succession of frames provides the illusion of a continuously moving image. For a typical digital display, each frame is a two-dimensional array of pixels which have colors or intensities indicated by pixel values. The pixel values can be written to memory to store a moving image or transmitted to broadcast a moving image. However, in a typical digital application, the large amount of data that must be transmitted or stored for a high quality moving image makes transmitting or storing every pixel value for every frame of a moving picture impractical.

Many known moving image encoding techniques reduce the amount of data needed to represent a moving image. In difference-frame coding, a coder determines the difference between a predicted frame and a current frame of a moving image. The predicted frame may be, for example, the frame immediately before the current frame. The coder transmits a representation of the difference to a decoder. Since successive frames tend to be similar, the description of the difference typically requires less data than a description of the entire frame. The decoder having previously decoded the predicted frame combines the transmitted difference with the predicted frame to reconstruct the current frame.

In motion compensated coding, motion estimation modifies the previous frame to provide a predicted frame that is more similar to the current frame. Typically, the current frame is partitioned into blocks, which are for example 16-by-16 pixels; and for each block in the current frame, the coder searches the previous frame to locate a block which is similar to the block in the current frame. A motion vector indicates the position of the block in the previous frame which is similar to the block in the current frame. For each block in the current frame, the coder transmits, to the decoder, a motion vector and a representation of the difference between the block in the current frame and the block indicated by the motion vector. The decoder constructs the current frame from the blocks at the locations indicated by the motion vectors.

Determination of the motion vectors typically requires comparing a target block in the current frame to every block of the same size in a search window of the previous frame. The size of the search window depends on the range of motion vectors. Motion vectors having x and y components which range from −7 to 7 can indicate 225 different blocks in the previous frame, and a typical prior art encoder performs 225 comparisons of blocks to determine one motion vector with components that range from −7 to 7. Accordingly, determination of motion vectors can be a considerable calculational burden on a coder, and efficient search processes and circuits are needed to increase the speed and reduce the cost of coders which determine motion vectors.

SUMMARY OF THE INVENTION

A motion estimation circuit in accordance with an embodiment of this invention performs hierarchical searches to determine motion vectors for moving image encoding. The hierarchical search rather than comparing a target block in a current frame to fixed set of blocks in a search window, compares the target block to dynamically determined sets of blocks in the search window. The results of each comparison (or stage) of the search determines a next set of blocks to be compared to the target block in a next stage of the search. The hierarchical search reduces the total number of comparisons required to find a good match to the target block because the hierarchical search locates regions of the previous frame which are similar to the target block. Fewer location are searched, which allows a motion vector to be found more quickly than is possible in the prior art.

The hierarchical search may use two one-dimensional searches on perpendicular axes to locate a region which best matches the target block. For example, a one-dimensional search of locations on a first line through a search center indicates a direction along the first line toward blocks which provides a better fit to the target block. A second one-dimensional search of locations on a second line, perpendicular to the first line, indicates a direction along the second line toward blocks which provides a better fit to the target block. A new search center is selected according to directions determined by the two one-dimensional searches, and searches along two more lines are repeated in a second stage of the search.

One embodiment of the invention provides a search method for finding a motion vector for a target block in a current frame of a moving image. The method includes: selecting a first set of blocks of pixels from a previous frame in the moving image; comparing the target block to each block in the first set of blocks; selecting a second set of blocks from the previous frame, wherein the blocks in the second set are selected according to the results of comparing the target block to the first set of blocks; comparing the target block to each block in the second set of blocks; and generating a motion vector for the target block using results of comparing the target block to each block in the second set.

Selecting a set of blocks marks a stage in a hierarchical search. The generation of the motion vector may include one or more further stages after selection of the first and second sets. Typically, five blocks are selected at each stage, a central block and four blocks offset, by a step size, along a pair of perpendicular lines, from the central block. The step size is typically decreased with successive stages to provide a coarse search when there is less information about the regions of the search window and a fine search when the region most like the target block has been found.

A motion estimation circuit in accordance with an embodiment of this invention includes: parallel processing elements which generate parallel signals indicating differences between a target block and a set of blocks; a first memory that stores the target block and simultaneously asserts a pixel value from the target block to all of the processing elements; a second memory which stores a search window and asserts different search window pixel values to each of the processing elements; and an address generator that selects the pixel values that the second memory asserts to the processing elements.

Typically, the motion estimation circuit contains five parallel processing elements. One compares the target block to a central block, and four compare the target block to four block offset from the central block by a step size. The processing elements perform the parallel comparisons for each stage of a hierarchical search, and the address generator generates address signals which depend on results from a previous stage of the search. The second memory is divided into three parts. The size of the parts of the second memory are such that two of the parts contain a current search window used by the processing elements, and a third of the parts is loaded with pixel values for a next search window while the processing elements perform a search on the current search window.

The second memory can also be divided into nine memory modules, each module having an independently addressable output data port. Interleaving the data from a search window among the nine modules assures that for an even step size between the locations searched, no two processing elements ever simultaneously require pixel values from the same module. Interleaving pixel values among nine memory modules reduces the amount of memory required to simultaneously supply five parallel processors with five different pixel values from the current search window.

BRIEF DESCRIPTION OF THE DRAWINGS

FIG. 5 illustrates interleaving of search window pixel values in nine memory modules of a memory in accordance with an embodiment of this invention.

Use of the same reference symbols in different figures indicates similar or identical items.

DETAILED DESCRIPTION OF THE PREFERRED EMBODIMENTS

A motion estimation circuit in accordance with an embodiment of this invention performs hierarchical searches to determine motion vectors for moving image encoding. A hierarchical search rather than comparing a target block in a current frame to every block in a search window, compares the target block to iteratively determined sets of selected blocks in the search window, and each iteration (or stage) of the search indicates a next set of blocks selected for comparison. The hierarchical search reduces the total number of comparisons required to find the a good match to the target block. Accordingly, a motion vector may be found more quickly than is possible in the prior art.

Each target block in a current frame has a corresponding block which is at the same relative position in a previous frame. Typically, a motion vector indicates a displacement in the previous frame from the top-left corner pixel of the corresponding block to the top-left corner pixel of a closely matching block. For example, if the current frame and the previous frame are identical, each blocks of the current frame is identical to a corresponding block in the previous frame, and each block in the current frame may be assigned a motion vector with x and y components equal to zero. If the current frame and the previous frame differ, a non-zero motion vector can indicate a block in the previous frame that provides a closer match to the target block in the current frame.

Figure 1:
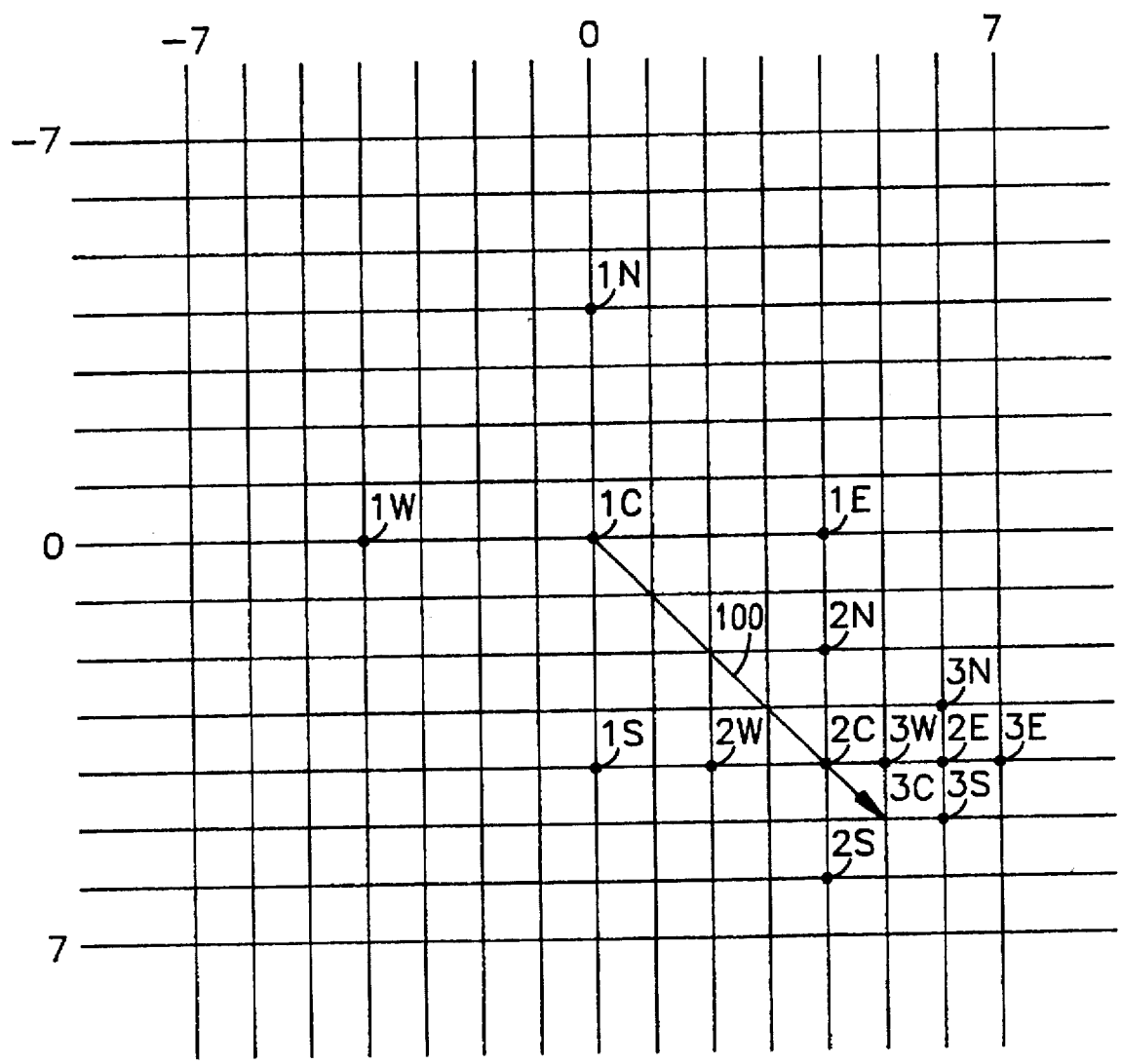
FIG. 1 illustrates an example hierarchical search in accordance with this invention.

FIG. 1 illustrates a Hierarchical One-Dimensional Search (HODS) of a search window in a previous frame, conducted to find a block which is similar to a target block in a current frame. Similarity is determined by a cost criterion such as the sum of the absolute differences between corresponding pixel values in the blocks compared. In FIG. 1, each cross point of the horizontal and the vertical lines represents the location of a top-left corner pixel of a block in the search window of the previous frame. The block having a location corresponding to the location of the target block has a top-left corner pixel at co-ordinates (0,0).

The size of the search window depends on the range of the motion vector components and the size of the blocks being compared. In FIG. 1, x and y components of motion vectors are restricted to a range between −7 and 7 (a 4-bit binary value for each component), but other ranges may be employed.

In the first stage of the HODS, five locations 1N, 1W, 1C, 1S, and 1E are searched by comparing the target block to blocks having top-left pixels at locations 1N, 1W, 1C, 1S, and 1E. The blocks are located along two axes, a horizontal (or y) axis and a vertical (or x) axis; and the blocks are separated from each other by a step size which is more than half of the largest possible absolute value of a motion vector component. In FIG. 1 where the largest motion vector component is 7, the initial step size is 4, and locations 1N, 1W, 1C, 1S, and 1E are (−4,0), (0,−4), (0,0), (4,0) and (0,4) respectively.

A cost criterion is calculated for each of the five blocks to determine a measure of the difference between the target block and each of the five blocks searched. A commonly used cost criterion is the Sum of Absolute Differences (SAD), but other cost criterion such as the Euclidean distance can be also used. In the following, $p(i,j)$ denotes the pixel value of the pixel in row $i$ and column $j$ of the target block of the current frame, where $i, j=0, 1, \ldots, 15$, for 16-by-16 pixel block. The target block and compared blocks are 16-by-16 for this example, but sizes other than 16-by-16 can be used. $s(m,n)$ denotes a pixel value in row $m$ and column $n$ of the search window in the previous frame. For 16-by-16 blocks and motion vectors having components in the range between −7 and 7, the search window is a 30-by-30 pixel block, and m and n range from −7 to 22. The SAD for a block having has a top-right corner pixel at co-ordinates $(r,t)$ in the search window, is defined as follows.

$$B(t,r) = \sum_{i=0}^{15} \sum_{j=0}^{15} |p(i,j) - s(i-t, j-r)|$$

After costs for the five blocks having top-right corners at locations 1N, 1W, 1C, 1S, and 1E are calculated, a minimum cost is determined from costs of the blocks having top-left corners 1W, 1C, and 1E on the horizontal axis, and a minimum cost is determined from costs of the blocks having top-left corners 1N, 1C, and 1S on the vertical axis. A center block for a second stage of the HODS has a top-right corner 2C having a y co-ordinate equal to the y co-ordinate of the location 1W, 1C, or 1E having minimum cost and has an x co-ordinate equal to the x co-ordinate of the location 1N, 1C, or 1S having minimum cost.

For example, if the cost criterion is the SAD and the minimum SAD along the horizontal axis, i.e. among B(0,−

4), B(0,0), B(0,4), is B(0,4), then the y coordinate of search center 2C for the second stage of HODS is 4. If the minimum SAD along the vertical direction, i.e. among B(-4,0), B(0,0), B(4,0), is B(4,0), then the x co-ordinate of search center 2C for the second stage is also 4. Thus, in the second stage, search center 2C is at (4,4), and five search locations 2N, 2W, 2C, 2S, and 2E are arranged along the horizontal and vertical lines through location 2C in a pattern similar to the arrangement of locations 1N, 1W, 1C, 1S, and 1E used in the first stage, but locations 2N, 2W, 2C, 2S, and 2E are separated by half of the step size of the first stage. In FIG. 1, search locations 2N, 2W, 2C, 2S, and 2E are at (2,4), (4,2), (4,4), (4,6) and (6,4), separated by a step size of 2. The costs for locations 2N, 2W, 2C, 2S, and 2E of the second stage are computed, and a center 3C for a third stage of the search is determined from the minimum of the costs along a horizontal line and a vertical line.

For the example shown in FIG. 1, B(4,4) is the minimum of B(4,2), B(4,4), or B(4,6), and B(6,4) is the minimum of B(2,4), B(4,4), or B(6,4). Search center 3C is at (4,6) which also happens to be location 2E. In stage three of the HODS, five search locations 3N, 3W, 3C, 3S, and 3E are arranged at points (3,6), (4,5), (4,6), (4,7) and (5,6) in FIG. 1. The step size between search locations 3N, 3W, 3C, 3S, and 3E for third stage is one (half the step size used in second stage). Since location (4,6) has been searched in the second stage, the cost calculation for location (4,6) does not need to be repeated, but costs for the remaining four locations 3N, 3W, 3S, and 3E are computed.

For the last stage of the HODS which is the third stage in the example of FIG. 1, determination of the minimum costs indicate the x and y components of a motion vector 100. In the example of FIG. 1, the horizontal minimum cost location is location 3W, (4,5), and the y-component of motion vector 100 is 5. The vertical minimum SAD location is 3S, (5,6), and the x-component of the motion vector is 5. Thus, motion vector 100 of the example in FIG. 1 has x and y components (5,5).

The example HODS illustrated by FIG. 1 is a search involving a target block which is away from an edge of the current frame. For target blocks on the edge of the current frame, the edge of the previous frame limits the search window and reduces the number of locations that can be searched. Accordingly, the number searches preformed for a target block at an edge of the current frame is reduced because at least one of locations 1N, 1W, 1S or 1E is not in the previous frame. The example HODS of FIG. 1 searches 14 locations to determine motion vector 100. This is significantly less than the 225 which would be searched if every block in the search window was compared to the target block in the current frame.

In some cases, motion vector 100 does not indicate the block in the search window which is most similar to the target block in the current frame, and motion vector 100 not being the best can result in a decrease in the amount of compression or a decrease in the image quality. However, HODS tends to guide the locations searched toward the region of a search window where the most similar block is, and motion vector 100 found by HODS provides a good fit suitable for moving image coding. For one exemplary moving image, coded transmission of the moving image using motion vectors found by HODS had an increase in peak signal-to-noise ratio (PSNR) of less than about 0.5 Db when compared to coded transmission at the same bit rate using motion vectors found by a full search of every block in a search window. In most applications, the small degradation of image quality is offset by the significant decrease in hardware required for real time motion coding.

Table 1 illustrates a schematic program structure for implementing a HODS.

TABLE 1

| | |
|---|---|
| 1 | Initialize a step size k and the components $\Delta x$ and $\Delta y$ of an estimated motion vector; |
| 2 | While (k ≥ 1) |
| 3 | For (x,y) equal to $(\Delta x, \Delta y)$, $(\Delta x + k, \Delta y)$, $(\Delta x - k, \Delta y)$, $(\Delta x, \Delta y + k)$, and $(\Delta x, \Delta y - k)$, |
| 4 | if the location (x,y) has not been searched, compute cost criterion B(x,y); |
| 5 | end of for; |
| 6 | set $\Delta x$ equal to the x-coordinate of minimum of $\{B(\Delta x - k, \Delta y), B(\Delta x, \Delta y), B(\Delta x + k, \Delta y)\}$; |
| 7 | set $\Delta y$ equal to the y-coordinate of minimum of $\{B(\Delta x, \Delta y - k), B(\Delta x, \Delta y), B(\Delta x, \Delta y + k)\}$; |
| 8 | set k equal to k/2; |
| 9 | end of while; |
| 10 | motion vector = $(\Delta x, \Delta y)$. |

In the program of Table 1, the initial estimated motion vector $\Delta x$, $\Delta y$ will typically be zero (or a vector which indicates the block at a position in the previous frame corresponding to the position of the target block) because typically the corresponding block will be similar to the target block. The window searched for a better match depends on initial step size k. If initial step size k is $2^n$ (e.g. 2, 4, or 8) then the search covers a range of motion vectors having components from $-(2^{n+1}-1)$ to $2^{n+1}-1$ (e.g. -3 to 3, -7 to 7, or -15 to 15). Steps sizes which are not powers of 2 may also be used. If desired, a different steps size could be used for the horizontal and vertical directions, for example to search a rectangular search window. Additionally, the HODS may be terminated before the step size k is reduced to one. Other variations of the program of Table 1 will be apparent to those skilled in the art.

Figure 2:
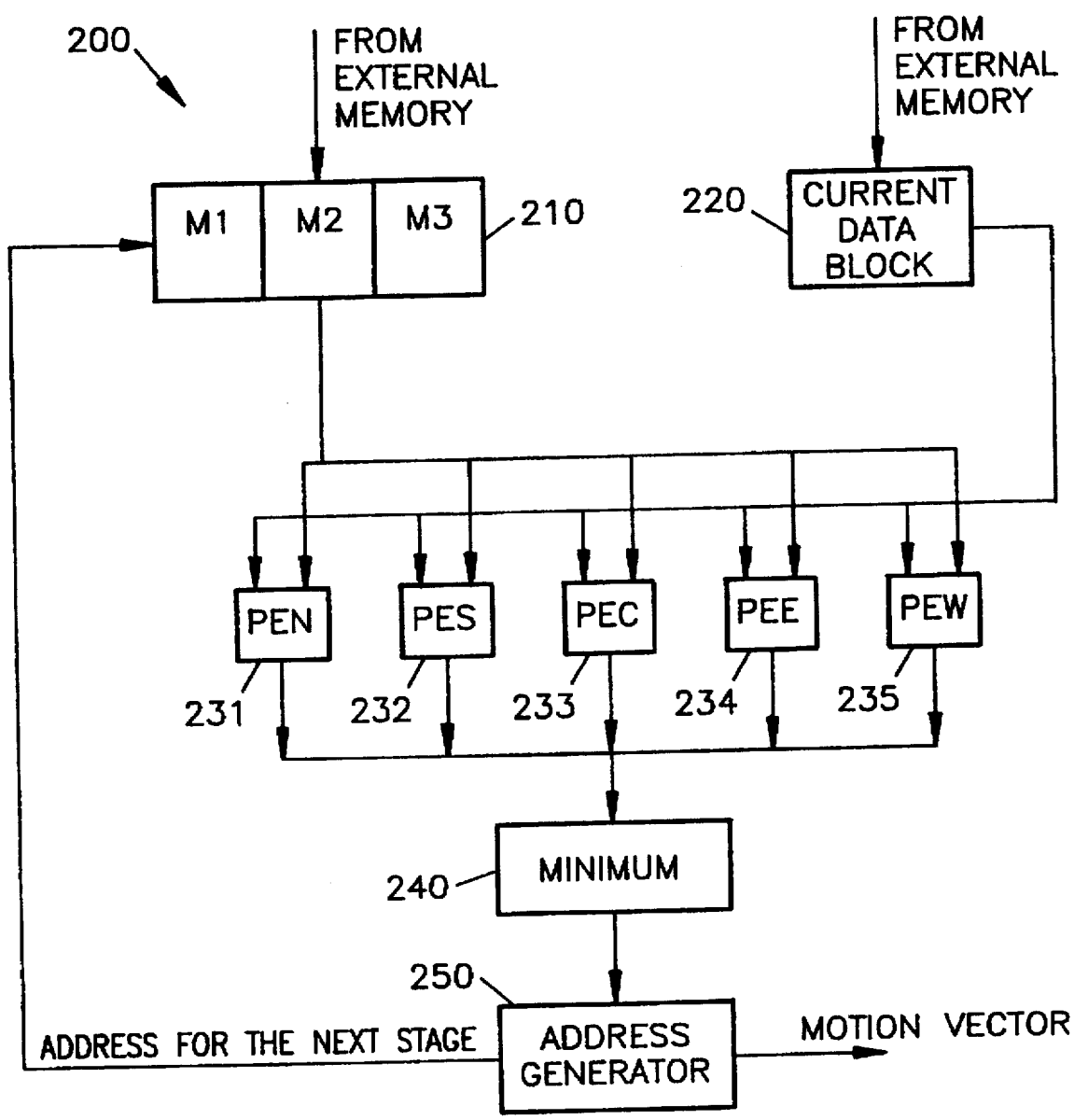
FIG. 2 shows a block diagram of a motion estimation circuit in accordance with an embodiment of this invention.

FIG. 2 shows a block diagram of a motion estimation circuit 200. Motion estimation circuit 200 is described for an embodiment which handles 16-by-16 pixel target blocks and a maximum possible motion vector component of 7, but the architecture shown in FIG. 2 also works for other searches. Motion estimation circuit 200 contains an on-chip three-part memory 210 for storing search windows and an on-chip memory 220 for the target block.

Figure 3A:
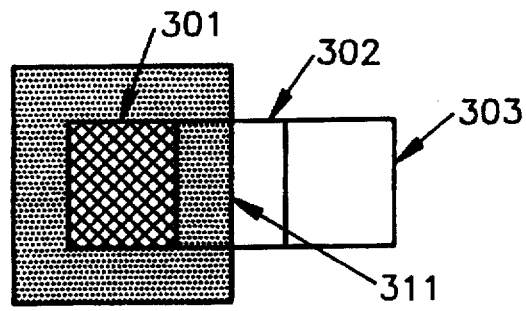
FIG. 3A, 3B, 3C, and 3D illustrate the relationships among target blocks in a current frame, search windows in a previous frame, and a three-part memory used in accordance with this invention to store the search windows.
Figure 3B:
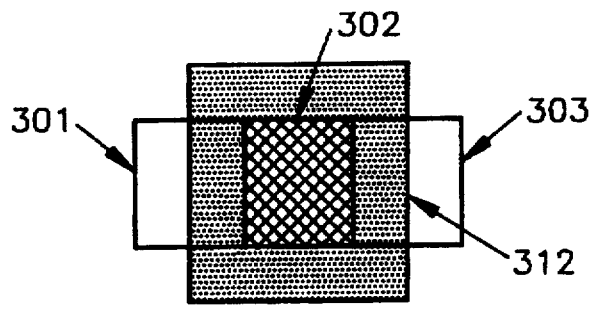
Figure 3C:
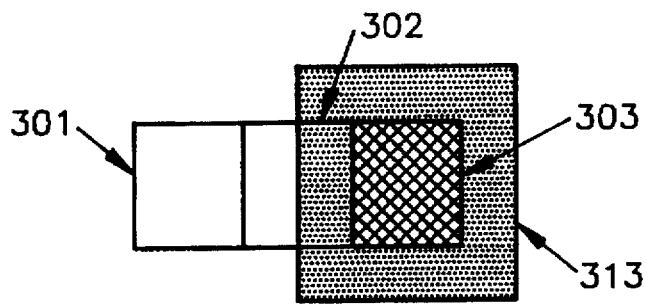

FIG. 3A shows the relative locations of a target block 301 in a current frame and a search window 311 in the previous frame. FIG. 3A also shows the positions of the next two target blocks 302 and 303 for which motion vectors are determined. FIGS. 3B and 3C show the relative positions of search windows 312 and 313 for blocks 302 and 303 respectively. Search windows 311, 312, and 313 of the consecutive target blocks 301, 302, and 303 overlap. For example, search windows 311 and 312 overlap by about half of their width.

Figure 3D:
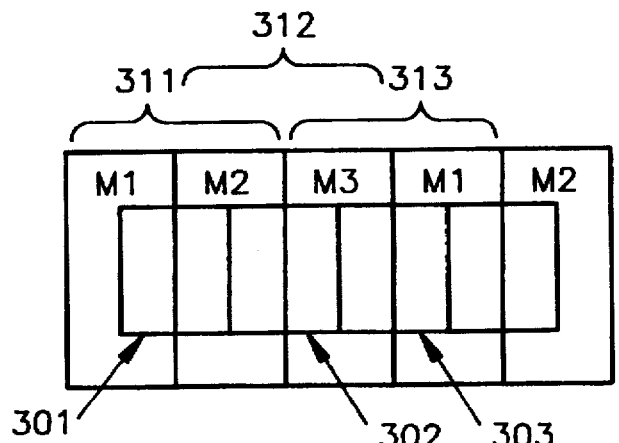

Memory 210 (FIG. 2) is partitioned into three parts M1, M2, and M3. Each part M1, M2, or M3 stores 480 (16×30) pixel values, for the case where 16 is width of each target block and 30 is the height (and width) of each search window. For target block 301, search window 311 is stored in memory parts M1 and M2 as shown in FIG. 3D. Memory part M1 holds the left part (16 columns) of search window 311. Memory part M2 holds the right part (14 columns) of search window 311. The left part (16 columns) of search window 312 overlaps the right part of search window 311 and is also stored in memory part M2.

During motion estimation for target block 301, the right part of search window 312 (which is also the left part of search window 313) is read into M3 from an external memory (not shown). Accordingly, search window 312 for target block 302 is in parts M2 and M3 before motion estimation for target block 302 begins. The motion vector for target block 302 is determined from the data in memory parts M2 and M3, and the right part of search window 313 for target block 303 is loaded into M1 while doing motion estimation for block 302. In this way, search window 313 will be ready in memory parts M3 and M1 before motion estimation for block 302 ends and motion estimation for block 303 begins. Three-part on-chip memory 210 reduces the bandwidth requirement for access to external memory because overlapping portions of two search windows are read from the external memory once and fewer new pixel values are read for each search.

Target blocks 301, 302, and 303 shown in FIGS. 3A to 3C are away from the edge of current frame. Target blocks which are at an edge of the current frame do not require a full 30-by-30 search window for a HODS. Accordingly, in memory 210, the values which are at addresses indicating a location outside a frame are irrelevant to the HODS. For a block at the right edge of the current frame, one part M1, M2, or M3 holds all the relevant search window pixel values, and no right part of the search window is required. During the time when the right part would be loaded, the left part of the search window for a following target block is loaded in to the next memory part M2, M3, or M1. Typically, the target block following a block on the right edge is a block at the left edge of a next row of blocks in the frame.

Returning to FIG. 2, five parallel processing elements 231 to 235 receive search window pixel values from memory 210 and target block pixel values from memory 220, and calculate five costs for each stage in a HODS. Circuit block 240 determines a vertical minimum of costs from processing elements 231 to 233 and a horizontal minimum of costs from processing elements 233 to 235 and provides to an address generator 250 x and y components of a search center aligned with the blocks having the vertical and horizontal minimum costs. Address generator 250 generates an address signal which indicates the locations to be searched in a stage, and following the last stage, generates a signal indicating the motion vector found in the HODS.

Motion estimation circuit 200 executes a HODS process indicated in Table 1 as the follow. Address generator 250 initializes and changes the step size k and the estimated motion vector ($\Delta x, \Delta y$) as required for the HODS and for generation of address signals selecting the search location from memory 210. The "while" loop between line 2 and line 9 is executed as sequential stages. In each stage, the computation of the costs as described by the "for" loop between line 3 and line 5 of Table 1 is executed in parallel by the five processing elements 231 to 235. Processing elements 231, 232, 233, 234, and 235 calculate costs for the locations ($\Delta x-k,\Delta y$), ($\Delta x+k,\Delta y$), ($\Delta x,\Delta y$), ($\Delta x,\Delta y+k$), and ($\Delta x,\Delta y-k$) respectively. Circuit block 240 determines x and y components of a search center for the next stage based on the costs from processing elements 231 to 235.

Figure 4:
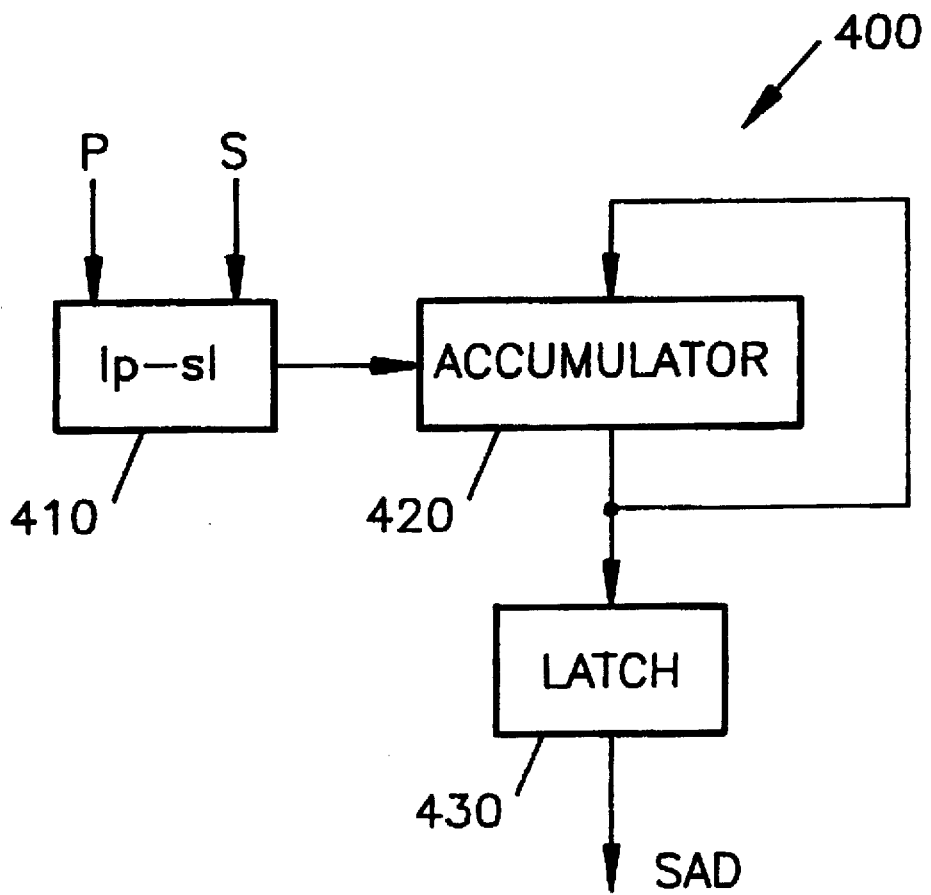
FIG. 4 shows a block diagram of a processing element usable in the embodiment of FIG. 2.

FIG. 4 shows a processing element 400 for an embodiment of this invention where the cost criterion is the SAD. Processing element 400 contains a math block 410 which determines the absolute value of the difference between a pixel value p from a target block in the current frame and a pixel value s from a search window in the previous frame. In 256 clock cycles (one for each pixel value in the target block), pixel values p and s are asserted to math block 410, and an accumulator 420 accumulates a sum of the absolute values of the differences. After the difference between the last pixel values p and s are accumulate, a latch 430 stores the total SAD while accumulator 420 is reset for a next stage of the HODS or for a next HODS.

In one embodiment of motion estimation circuit 200 of FIG. 2, each of processing elements 231 to 235 is identical to processing element 400. Memory 220 broadcasts target block pixel values p(i,j) to all processing elements, so that each processing element simultaneously receives the same pixel value p(i,j). An index i or j which indicates the row or column of the pixel value p(i,j) changes by one each clock cycle. Memory 210 asserts a different pixel value to each of the blocks 231 to 235. During each clock cycle, processing elements 231, 232, 233, 234, and 235 receive pixel values s($\Delta x-k+i,\Delta y+j$), s($\Delta x+k+i,\Delta y+j$), s($\Delta x+i,\Delta y+j$), s($\Delta x+i,\Delta y-k+j$), and s($\Delta x+i,\Delta y+k+j$) from memory 210. Typically, memory 210 has at least five independently addressable output data ports.

Figure 5:
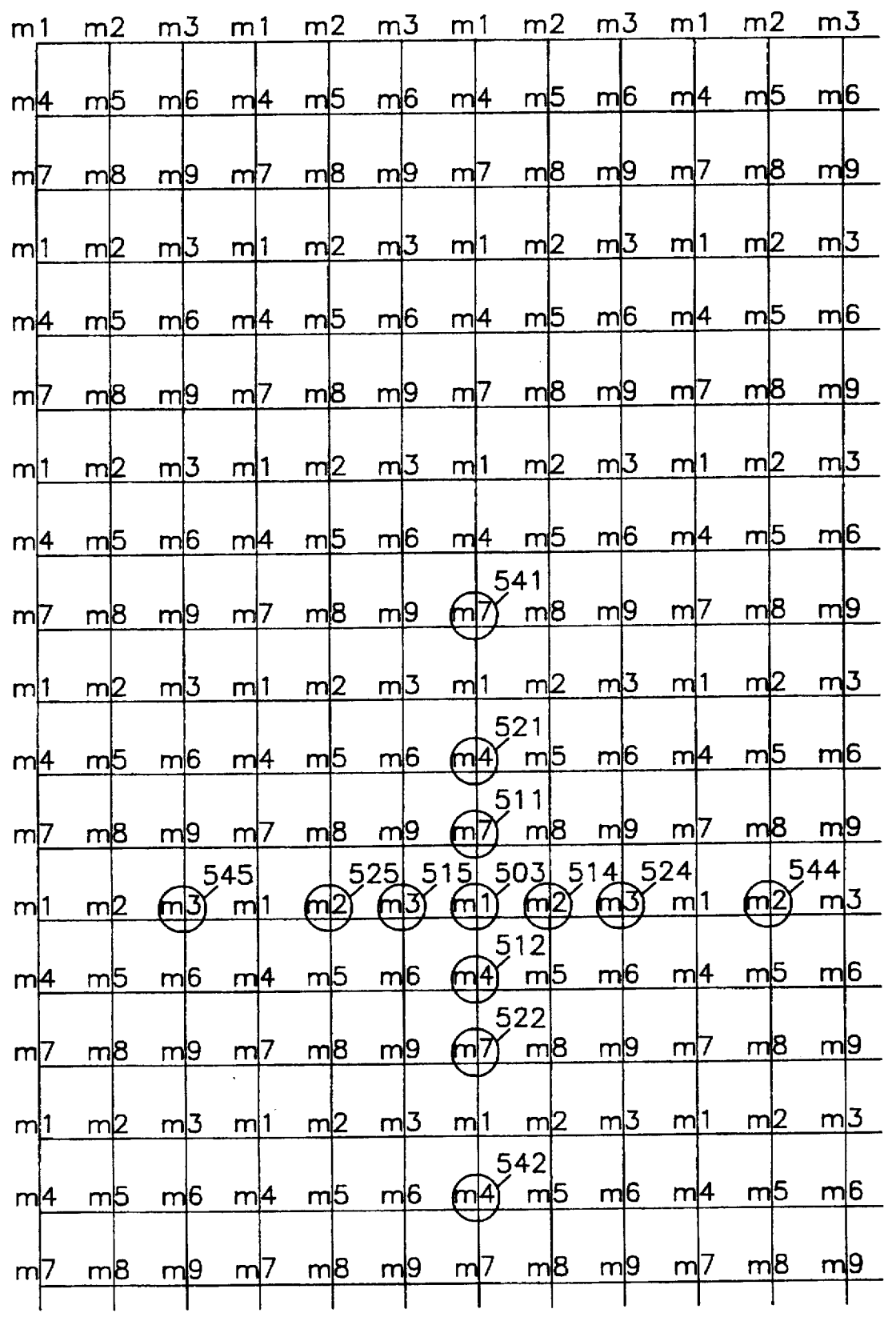

In one embodiment of this invention, each part of M1, M2, and M3 of memory 210 is divided into nine memory modules m1 to m9. Each module m1 to m9 has an independently addressable output data port for providing a search window pixel value to one of the five processing elements 231 to 235. The search window pixel values are interleaved in the nine memory modules m1 to m9 of memory part M1 as shown in FIG. 5. For each row of pixel values, three consecutive memory modules are used cyclically. Modules m1, m2, and m3 store the first row of pixel values. Modules m4, m5, and m6 store the second row, and modules m7, m8, and m9 store the third row. The next three rows, the fourth, fifth and sixth, are stored in the same pattern as the first three rows. This three-row pattern for storage is repeated for the rest of rows stored in memory part M1. Memory parts M2 and M3 are structured in the same way, so that memory 210 includes a total of 27 modules (nine modules for each part M1, M2, and M3).

The interleaved storage pattern of modules m1 to m9 in FIG. 5 assures that if the step size between search locations is not a multiple of three, no two of processing elements 231 to 235 simultaneously require data from the same one of modules m1 to m9. During each clock cycle, processing element 233 compares a pixel value p(i,j) from the target block to a search window pixel value s($\Delta x+i,\Delta y+j$), and processing elements 231, 232, 234, and 235 compare search window pixel values s($\Delta x-k+i,\Delta y+j$), s($\Delta x+k+i,\Delta y+j$), s($\Delta x+i,\Delta y-k+j$), and s($\Delta x+i,\Delta y+k+j$) to the pixel value p(i,j). For example, during a particular clock cycle, the search window pixel value s($\Delta x+i,\Delta y+j$) for processing element 223 is pixel value 503 from module m1 of memory 210. The other search window pixel values are offset from pixel value 503 by the step size. If the step size is two, processing element 231 compares p(i,j) to pixel value 521 which is from memory module m4, processing element 232 compares p(i,j) to pixel value 522 which is from memory module m7, processing element 234 compares p(i,j) to pixel value 524 which is from memory module m3, and processing element 235 compares p(i,j) to pixel value 525 which is from memory module m2. For a step size of one, processing elements 231, 232, 234, and 235, uses pixel values 511, 512, 514, and 515 in modules m7, m4, m2, and m3, respectively. More generally, since the interleaving pattern of FIG. 5 repeats after three pixel values either horizontally or vertically, the same module is used twice only if the step size is a multiple of three.

Figure 6:
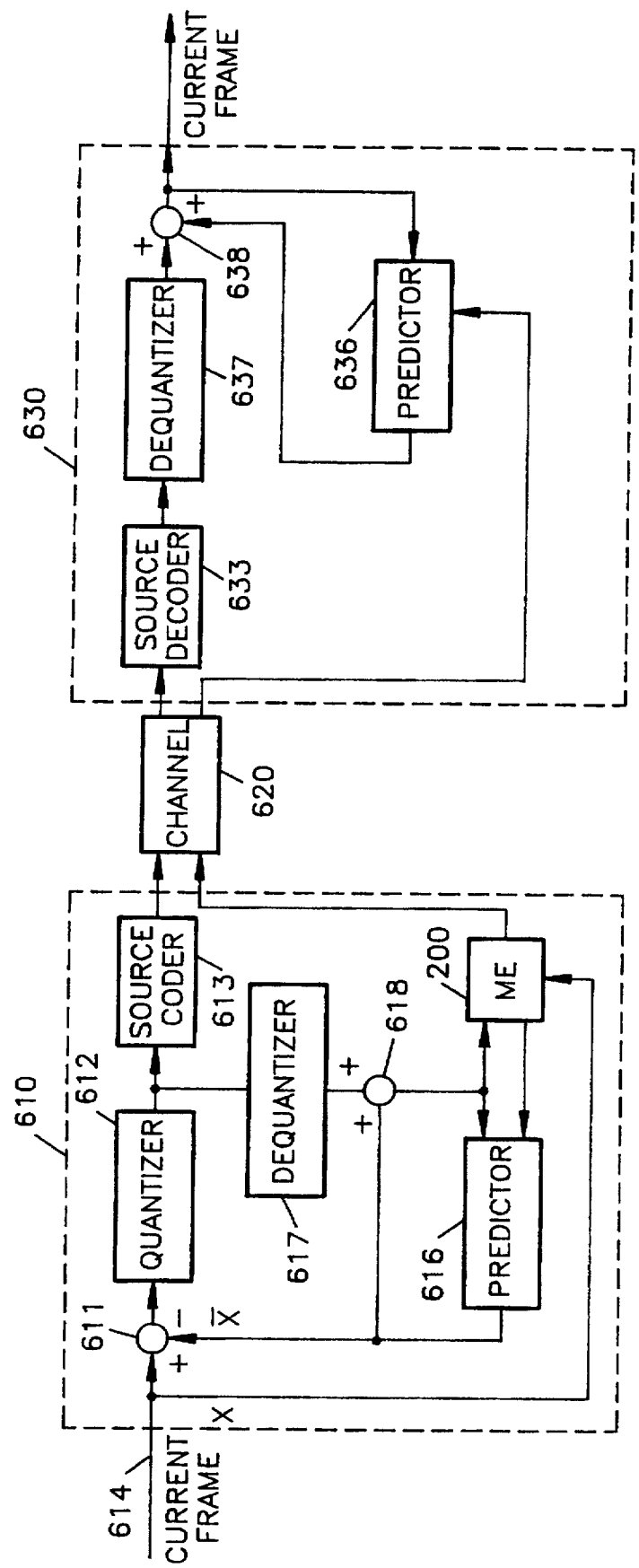
FIG. 6 shows a block diagram of a moving image coder and a moving image decoder in accordance with and embodiment of this invention.

FIG. 6 shows a moving image coder 610 in accordance with an embodiment of this invention. Coder 610 receives a series of frames of a moving image from an external source (not shown) which may be for example a memory or a video camera. Coder 610 transmits a coded representation of moving image, over a channel 620 to a moving image decoder 630. Channel 620 may for example be an integrated services digital network (ISDN) line or a local area network (LAN) line or modems and a phone line. Decoder 630 decodes the coded representation and generates a series of frames which represent the moving image.

Each frame received by coder 610 is represented by one or more two-dimensional arrays of pixel values. For a typical black-and-white or gray scale image, the pixel values represent the intensity of a pixel in a two-dimensional display. Pixel values for color images typically represent either a color index which identifies a color from a pallet of colors or represents the magnitude of one or more color components in conventional color representations such as RGB or YUV. For conventional color components, each frame is represented either by three two-dimensional arrays (color planes) or by a single two-dimensional array containing (chunky) pixel values which are a combination of the three component values. The following example considers the case of a gray scale moving image. Other application will be apparent to those skilled in the art.

A two-dimensional array representing the current frame is applied via a bus 614 to a subtractor 611 and to motion estimation circuit 200, a target block at a time. Motion estimation circuit 200 determines a motion vector for each target block, and supplies the motion vector to a predictor 616. Predictor 616 selects from a decoded previous frame a predicted block indicated by the motion vector, and asserts pixel values from the predicted block to subtractor 611. Subtractor 611 determines the difference between the target block and the predicted block. The difference generated by subtractor 611 is a data block which is the difference between the pixel values in the target block and the corresponding pixel values in the predicted block. If the predicted block is sufficiently similar to the target block, most of the values in the difference are small or zero.

A quantizer 612 converts the difference between the target block and the predicted block from a standard two-dimensional array representation to a compressed representation which on average reduces the amount of data required to represent the difference. The representation can either be exact or can be an approximation. U.S. patent application Ser. No. 08/153,322, filed Nov. 15, 1993, entitled "QUADTREE-STRUCTURED WALSH TRANSFORM VIDEO/IMAGE CODING" describes a quantizer that uses a quadtree structured Walsh transformation, linear quantization, and Huffman coding to represent a difference and is incorporated by reference herein in its entirety.

A source coder 613 formats and encodes the quantized representation from quantizer 612 for transmission on channel 620. Motion vectors corresponding to the quantized representation are also transmitted through channel 620 to decoder 630. A source decoder 633 in decoder 630 receives the coded signal from channel 620 and decodes the quantized representation of the difference to a dequantizer 637. Dequantizer 637 performs the inverse operation of quantizer 612 and generates a two-dimensional array representing the difference between the target block and the predicted block. The two-dimensional array typically differs from the difference generated by subtractor 611 for a variety of reasons. For example, the quantized representation from quantizer 612 may be an approximation to reduce the amount of data transmitted or may contain round off error.

An adder 638 adds difference blocks from dequantizer 637 to blocks from a predictor circuit 636. Predictor 636 provides the blocks from the previous frame, indicated by the motion vectors from coder 610. Typically, while dequantizer 637 is decoding a difference for a block, predictor circuit 636 uses a motion vector from channel 620 to retrieve from the previous decoded frame a block indicated by the motion vector. The previous decoded frame is typically stored in an external memory (not shown) which is accessible by predictor circuit 636, but alternatively may be stored in predictor circuit 636. The result of the addition performed by adder 638 is a two-dimensional array which is approximately equal to the two-dimensional array representing the current frame.

Coder 610 contains a dequantizer 617 and an adder 618 which are identical to dequantizer 637 and adder 638 respectively. Dequantizer 617 receives the quantized representation of the differences from quantizer 612 which adder 618 combines with the predicted blocks from predictor circuit 616 to generate a decoded current frame which is identical to the decoded current frame produced by adder 638 in decoder 630. The decoded current frame may be saved to an external memory (not shown) and used by predictor 616 to generate a predicted blocks for the next frame in series.

Although the present invention has been described with reference to particular embodiments, the description is only an example of the invention's application and should not be taken as a limitation. Various adaptations and combinations of features of the embodiments disclosed will be apparent to those skilled in the art and are within the scope of the present invention as defined by the following claims.

We claim:

1. A method for generating a motion vector for moving image encoding, comprising:
   selecting a target block by storing pixel values of the target block in a first memory;
   selecting a first set of blocks including a first block, a second block, a third block, a fourth block and a fifth block in the previous frame, wherein the first, second, and third blocks have top-left corner pixels which are on a first axis in the previous frame and the first, fourth and fifth blocks have top-left corner pixels which are on a second axis of the previous frame, wherein selecting the first set of blocks comprises:
      storing pixel values of a search window of the second two-dimensional array, in a second memory; and
      generating address signals for the second memory, which select pixel values of the first set of blocks;
   comparing the target block to each block in the first set by:
      asserting a pixel value from the first memory to five processing elements simultaneously;
      asserting five different pixel values from the second memory to the five processing elements;
      repeating asserting values from the first and second memory; and
      accumulating five costs indicating differences between the pixel value from the first memory and the pixel values from the second memory;
   selecting a second set of blocks of pixels from the second two-dimensional array, wherein the blocks in the second set are selected according to results of comparing the target block to each block in the first set;
   comparing the target block to each block in the second set of blocks; and
   generating a motion vector for the target block using results from comparing the target block to each block in the second set.

2. A process for generating a motion vector corresponding to a target block in a current flame of a moving image, the process comprising:
   (a) selecting a step size;
   (b) storing a first component and a second component of an estimated motion vector in a memory, the estimated motion vector identifying a first block in a second frame of the moving image;

(c) determining a first cost which indicates a difference between the target block and the first block;

(d) determining second, third, fourth, and fifth costs which indicate differences between the target block and second, third, fourth, and fifth blocks in the second frame, wherein a vector formed by adding the step size to the first component of the estimated motion vector identifies the second block, a vector formed by subtracting the step size from the first component of the estimated motion vector identifies the third block, a vector formed by adding the step size to the second component of the estimated motion vector identifies the fourth block, and a vector formed by subtracting the step size from the second component of the estimated motion vector identifies the fifth block;

(e) increasing the first component of the estimated motion vector by the step size in response to the second cost being less than the first and third costs;

(f) reducing the first component of the estimated motion vector by the step size in response to the third cost being less than the first and second costs;

(g) increasing the second component of the estimated motion vector by the step size the fourth cost being less than the first and fifth costs;

(h) reducing the second component of the estimated motion vector by the step size in response to the fifth cost being less than the first and fourth costs;

(i) reducing the step size;

j) repeating steps (c) through (i) one or more times; and (k) generating a motion vector which equals the estimated motion vector.

3. The method of claim 2, wherein repeating steps (c) through (i) one or more times comprises repeating steps (c) through (i) until the step size is less than one.

4. The method of claim 2, wherein the first, second, third, fourth, and fifth costs are determined simultaneously.

5. The method of claim 2, wherein determining a cost comprises calculating the cost if the cost was not previously determined, and using a previously determined cost if the cost was previously determined.

6. A motion estimation circuit comprising:

a plurality of processing elements, wherein each processing element converts data signals representing pixel values for first and second blocks into a cost representing a difference between the first and second blocks;

a first memory operably coupled to simultaneously assert a first data signal to all of the processing elements, the first data signal representing a pixel value from a target block which is stored in the first memory; and a second memory operably coupled to simultaneously assert second data signals to the processing elements, wherein the second data signals are independent of each other, each second data signal representing a pixel value from a different block in a search window which is stored in the second memory.

7. The motion estimation circuit of claim 6, wherein the second memory comprises three parts, such that data can be written into any one of the parts of the memory while data is read from either of the other two parts of the memory.

8. The motion estimation circuit of claim 7, wherein each part of the second memory comprises nine modules, each module having an independently addressable data port coupled to the processing elements.

9. The motion estimation circuit of claim 6, wherein the second memory comprises modules, each module having an independently addressable data port coupled to the processing elements.

10. A method for generating a motion vector, the method comprising:

selecting a search center in a two-dimensional array of pixels;

performing a series of search stages, each search stage comprising:

searching a first set of blocks of pixels in the two-dimensional array, wherein blocks in the first set are aligned along a first line through the search center;

identifying a first block which of the blocks in the first set most closely matches a target block;

searching a second set of blocks of pixels in the two-dimensional array, wherein blocks in the second set are aligned along a second line through the search center;

identifying a second block which of the blocks in the second set most closely matches the target block; and changing the search center for a next search stage in the series so that the search center is aligned with the first and second blocks, wherein in response to the first block not being aligned along the second line and the second block not being aligned along the first line, the search center for the next search stage is offset from the first and second lines; and generating the motion vector from the search center after completing the search stages.

11. The motion estimation circuit of claim 6, wherein the plurality of processing elements comprises five processing elements.

12. A method for moving image encoding, comprising:

writing pixel values into a first part of a memory, wherein the pixel values in the first part of the memory represent part of a first search window;

writing pixel values into a second part of the memory, wherein the pixel values in the second part of the memory represent a part of the first search window which overlaps a first part of a second search window;

determining a first motion vector for a first target block using the pixel values in the first and second parts of the memory;

writing pixel values into a third part of the memory, wherein the pixel values in the third part of the memory represent a second part of the second search window and are written to the third part of the memory simultaneously with determining the first motion vector; and determining a second motion vector for a second target block using pixel values that were written in the second part of the memory before determining the first motion vector and using pixel values that were written in the third part of the memory while determining the first motion vector.

13. The method of claim 12, wherein the pixel values representing the second part of the second search window also represent a first part of a third search window, and the method further comprises:

writing pixel values for a second part of the third search window into the first part of the memory, wherein writing pixel values for the second part of the third search window is simultaneous with determining the second motion vector; and determining a third motion vector for a third target block using the pixel values in the third and first parts of the memory.

14. The method of claim 12, wherein writing pixel values into the first, second, and third parts of the memory respectively comprises writing to a first, second, and third data ports of the memory.

15. A motion estimation circuit comprising:

a first memory for storing pixel values of a target block;

a second memory for storing pixel values of search areas, the second memory having a first, a second, and a third parts, each part having a data port for writing pixel values to that part, wherein two of the three parts of the second memory are required to store pixel values of a search area for the target block;

a first processing element operably coupled to process pixel values from the first memory and the second memory; and an address generator which selects pixel values from two of the first, second, and third parts of the second memory to be processed by the first processing element while pixel values of a search area for another block are written to the one of the first, second, and third parts of the second memory not containing the pixel values being selected.

16. The motion estimation circuit of claim 15, wherein:

the first processing element, and the first and second memories are integrated together on a die;

the circuit further comprises a third memory external to the die; and pixel values from the third memory are written into the second memory while the first processing element receives pixel values from the first and second memory.

17. A motion estimation circuit comprising:

a first memory for storing pixel values of a target block;

a second memory for storing pixel values of a search area; and a plurality of processing elements coupled to the first and second memories, wherein:

the second memory comprises nine modules, each module having a data port for reading pixel values from that module, the data ports being coupled to the processing elements; and a two-dimensional array of pixel values representing the search area is stored in the nine modules such that:

each pixels value in a first row of the array is stored in a first, second, or third of the nine modules;

each pixels value in a second row of the array is stored in a fourth, fifth, or sixth of the nine modules; and each pixels value in a third row of the array is stored in a seventh, eighth, or ninth of the nine modules.

18. The motion estimation circuit of claim 17, wherein:

in the first row, every third pixel value beginning with a first pixel value in the row is stored in the first module, every third pixel value beginning with a second pixel value in the row is stored in the second module, and every third pixel value beginning with a third pixel value in the row is stored in the third module;

in the second row, every third pixel value beginning with a first pixel value in the row is stored in the fourth module, every third pixel value beginning with a second pixel value in the row is stored in the fifth module, and every third pixel value beginning with a third pixel value in the row is stored in the sixth module; and in the third row, every third pixel value beginning with a first pixel value in the row is stored in the seventh module, every third pixel value beginning with a second pixel value in the row is stored in the eighth module, and every third pixel value beginning with a third pixel value in the row is stored in the ninth module.

19. The motion estimation circuit of claim 6, wherein a two-dimensional array of pixel values is stored in the nine modules, wherein each pixels value in a first row of the array is stored in a first, second, or third of the nine modules;

each pixels value in a second row of the array is stored in a fourth, fifth, or sixth of the nine modules; and each pixels value in a third row of the array is stored in a seventh, eighth, or ninth of the nine modules.

20. The motion estimation circuit of claim 19, wherein:

in the first row, every third pixel value beginning with a first pixel value in the row is stored in the first module, every third pixel value beginning with a second pixel value in the row is stored in the second module, and every third pixel value beginning with a third pixel value in the row is stored in the third module;

in the second row, every third pixel value beginning with a first pixel value in the row is stored in the fourth module, every third pixel value beginning with a second pixel value in the row is stored in the fifth module, and every third pixel value beginning with a third pixel value in the row is stored in the sixth module; and in the third row, every third pixel value beginning with a first pixel value in the row is stored in the seventh module, every third pixel value beginning with a second pixel value in the row is stored in the eighth module, and every third pixel value beginning with a third pixel value in the row is stored in the ninth module.

21. The motion estimation circuit of claim 6, further comprising an address generator operably coupled to the processing elements and to the second memory, the address generator providing to the second memory an address signal which selects the data signals that the second memory asserts to the processing elements.

22. The method of claims 12, wherein the first part of the memory comprises a first, second, third, fourth, fifth, sixth, seventh, eighth, and ninth modules, and writing the first part of the first search to the first part of the memory comprises:

writing each pixels value from a first row of the first part of the first search in a corresponding one of the first, second, and third modules;

writing each pixels value from a second row of the first part of the first search in a corresponding one of the fourth, fifth, and sixth modules; and writing each pixels value from a third row of the first part of the first search in a corresponding one of the seventh, eighth, and ninth modules.

23. The method of claim 22, wherein:

in the first row, every third pixel value beginning with a first pixel value in the row is written in the first module, every third pixel value beginning with a second pixel value in the row is written in the second module, and every third pixel value beginning with a third pixel value in the row is written in the third module;

in the second row, every third pixel value beginning with a first pixel value in the row is written in the fourth module, every third pixel value beginning with a second pixel value in the row is written in the fifth module, and every third pixel value beginning with a third pixel value in the row is written in the sixth module; and in the third row, every third pixel value beginning with a first pixel value in the row is written in the seventh module, every third pixel value beginning with a second pixel value in the row is written in the eighth module, and every third pixel value beginning with a third pixel value in the row is written in the ninth module.

24. The motion estimation circuit of claim 23, wherein the address generator generates address signals which depend on the output signals of the processing elements.

25. The method of claim 10, wherein in each search stage, the first line through the search center is parallel to a first axis and the second line through the search center is parallel to a second axis and perpendicular to the first axis.

26. The method of claim 10, further comprising reducing a step size by half between each search stage, wherein during each search stage, each block in the first set is separated from another block in the first set by the step size.

27. The method of claim 26, wherein during each search stage, each block in the second set is separated from another block in the second set by the step size.

28. The method of claim 10, wherein for each search stage:
   searching the first and second sets of blocks comprises determining for each block in the first and second sets a cost indicating a measure of difference between pixels in that block and pixels in the target block;
   identifying the first block comprises identifying a block in the first set having a cost that is smallest of costs for the blocks in the first set; and
   identifying the second block comprises identifying a block in the second set having a cost that is smallest of costs for the blocks in the second set.

29. The method of claim 10, wherein changing the search center for a next search stage comprises moving the search center by an offset, the offset being a vector having a first component equal to an offset along the first line from the first search center to the first block and a second component equal to an offset along the second line from the first search center to the second block.

* * * * *

UNITED STATES PATENT AND TRADEMARK OFFICE
CERTIFICATE OF CORRECTION

PATENT NO.    : 5,706,059
DATED         : January 6, 1998
INVENTOR(S)   : Xiaonong Ran; Michael van Scherrenburg It is certified that error appears in the above-identified patent and that said Letters Patent is hereby corrected as shown below:

Col. 12, line 2, after "comprises" insert --nine--.

Signed and Sealed this

Twenty-second Day of September, 1998

Attest:

BRUCE LEHMAN

*Attesting Officer*          *Commissioner of Patents and Trademarks*